United States Patent [19]

Boyer

[11] 3,719,802

[45] March 6, 1973

[54] HIGH-SPEED BAND READING DEVICE

[75] Inventor: Marcel-Louis Boyer, Chatillon, France

[73] Assignee: Compagnie Industrielle des Telecommunications Cit-Alcatel, Paris, France

[22] Filed: April 22, 1971

[21] Appl. No.: 136,496

[30] Foreign Application Priority Data

April 22, 1970 France..........................7014587

[52] U.S. Cl...........................235/61.11 R, 226/195

[51] Int. Cl...........................G06k 13/26, B65h 23/08

[58] Field of Search.340/259; 235/61.11 H, 61.11 E, 235/61.11 R; 226/29, 42, 33, 48, 128, 195; 242/55.12, 55.14, 75, 75.44, 190; 317/123

[56] References Cited

UNITED STATES PATENTS

| | | | |
|---|---|---|---|
| 3,389,399 | 6/1968 | Kennedy | 226/42 |
| 2,941,124 | 6/1960 | Gams et al. | 340/259 |
| 3,294,331 | 12/1966 | Wong et al. | 226/195 |
| 3,384,281 | 5/1968 | Mason | 226/195 |
| 3,517,895 | 6/1970 | Kraft | 226/195 |
| 3,525,480 | 8/1970 | Willard | 226/195 |

*Primary Examiner*—Daryl W. Cook
*Attorney*—Craig, Antonelli & Hill

[57] ABSTRACT

An electromechanical device for a tape winding mechanism which adapts the step-by-step advance at very high speed and at low inertia to the control of the winding and unwinding spools which have a great inertia, in the case where the band must be periodically stopped for an instant, including light-weight pulley arrangements responsive to starting and stopping operations for automatically providing the required slack in the tape to overcome the difficulties created by the high inertia of the spools.

8 Claims, 1 Drawing Figure

PATENTED MAR 6 1973 3,719,802
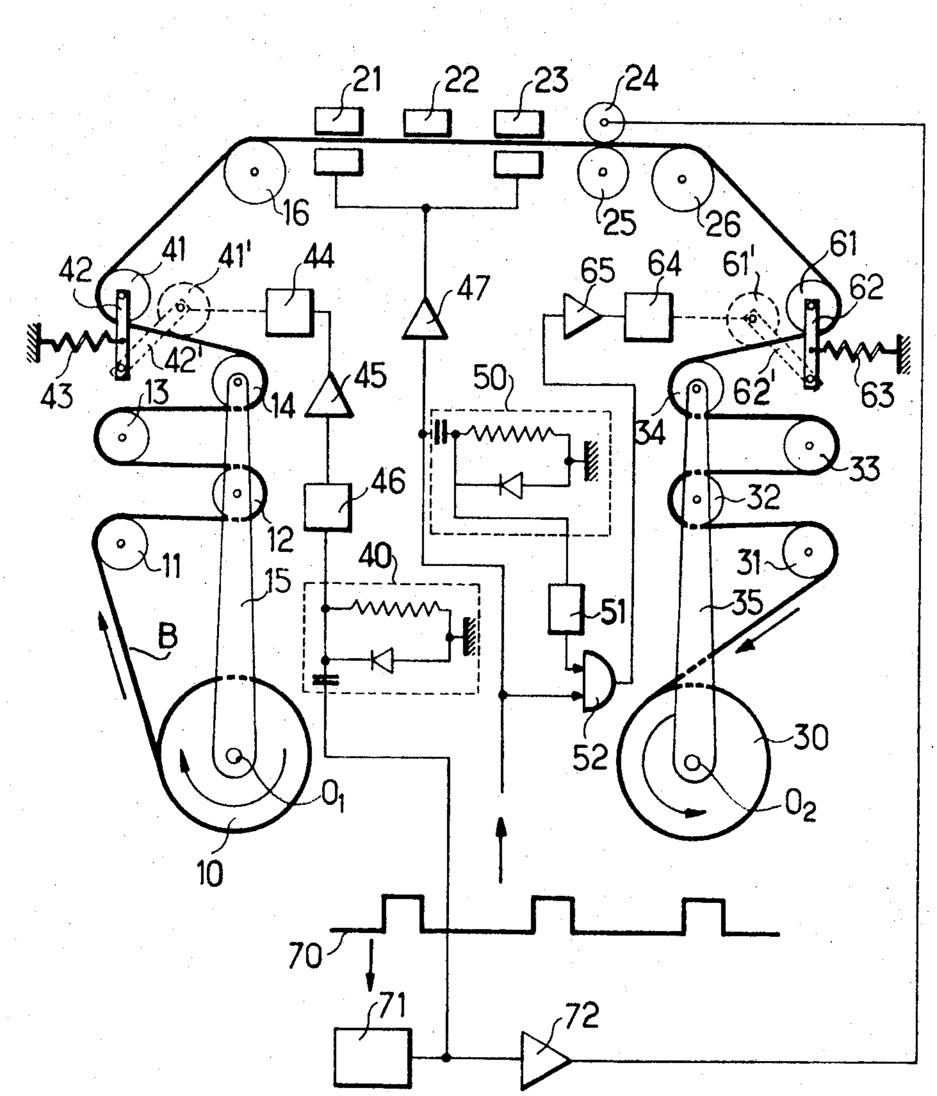
INVENTOR
MARCEL-LOUIS BOYER
BY Craig, Antonelli & Hill
ATTORNEYS

HIGH-SPEED BAND READING DEVICE

The present invention relates in general to the field of high speed reading devices for reading data provided on bands of perforated paper or magnetic tape at a very high speed, for example in the order of 1,000 types or characters per second, and more particularly to an electromechanical device which renders it possible to adapt the high speed step-by-step advance or progression of the punched tape, which has a low inertia, to the control of the winding and unwinding spools, which have a great inertia, in the case where the band must be stopped for only an instant. The application thereof is of interest in connection with the transmission of data.

In a perforated paper band, each type or character must be read upon stopping. The mean speed of the paper is constant, for example 2.54 meters per second. With a reading stroke or sequence of 1,000 types or characters per second, for example, the band is stopped every millisecond and advances each time by 2.54 meters. The relatively heavy supply spool and winding spool, however, have a great inertia and do not permit accelerations or decelerations in a sequence with a speed as fast as a millisecond.

Theoretical studies and experiments have shown that it is advantageous to brake for the shortest possible period of time and to reserve the longest possible time period for driving the capstan. For example, for a sequence of 1,000 types or characters per second, 100 to 150 $\mu$s will be reserved for braking and 850 to 900 $\mu$s for driving the capstan. It is evident that, as a result thereof, (1) the reading device should require a minimum amount of braking forces to complete its function; (2) the equivalent mass of paper to be put into motion should be minimal; and (3) the reactions of the feeding equipment and the capstan should be minimal.

In order to meet these conditions, it is known to operate with the aid of free or "beating" loops, as in the analogous case of cinematographic projectors, either with or without electronic control, or by means of an arm carrying guide rollers and having a low inertia. But the known systems which furnish satisfactory results up to limit in the order of 500 characters or types per second are no longer suitable for a speed in the other of 1,000 characters or types per second. It is therefore the object of the present invention to provide for a sure, simple and not very costly solution to the problem in connection with a perforated band reader which operates at a sequence or rhythm of at least 1,000 types or characters per second.

The present invention consists essentially in the use of very small and light-weight rollers, and a pivoting arm system or unit which imparts to the band the necessary "slack" when required to avoid the effects of the high inertia in the supply and winding spools.

One embodiment of the present invention, which has been given by way of example, will now be described hereinafter in further detail in conjunction with the sole figure which is a schematic diagram of a band reader.

The installation has been formed in a symmetrical unit or group. The paper band or tape B is unwound in the direction of the arrow from a driven storage or supply spool 10, passing on to stationary rollers 11, 13 and rollers 12, 14 which are mounted on an idler arm 15 which is slightly urged to rotate around the center $0_1$ with rotation of the spool 10 to maintain tension in the band. The band passes over a small, ultra-light roller 41, mounted on a small ultra-light arm 42, which is held in a normal position toward the left by means of a return spring 43 and is adapted to being urged or forced toward the right by means of an electromagnet 44. The electromagnet 44 is excited by a signal derived from the signal 10 extracted from an inverter 71 through a branch circuit 40, a monostable flip-flop 46, and an amplifier 45. The the band B is guided by a stationary roller 16 in the direction of a braking device or unit formed by braking members 21 and 23, positioned on either side of a reading device 22.

The band B is driven past the reading device by means of a capstan 24 supported against a roller 25 and is guided by a stationary roller 26 to a second ultra-light roller 61 which is mounted on a small ultra-light arm 62, held in a normal position toward the right by means of a return spring 63 and adapted to being urged or forced toward the left by means of an electromagnet 64. The band B travels to the driven winding spool 30 in the direction of the arrow through a pair of stationary rollers 33, 31 and roller 32, 34 which are slightly urged to rotate with an idler arm 35 around the center $0_2$ of the spool 30 to maintain tension in the band.

The braking control applied to the braking members 21, 23 is derived from signals which are symbolically represented at 70 applied from the output of a braking amplifier 47. The advance control of the capstan 24 is furnished by the same signals 70 applied through an inverter 71 and a drive amplifier 72.

The light-weight pivot arm 42 can be attracted toward the right by the electromagnet 44 in response to the control of a circuit comprising a branch or shunt network 40, a monostable flip-flop 46, and an amplifier 45. The light-weight pivot arm 63 may be attracted toward the left by the electromagnet 64 — under the conditions which will be further explained hereinbelow — due to the control of a logic circuit comprising, for example, a branch or shunt circuit 50, a monostable flip-flop 51, an AND circuit 52, and an amplifier 65.

The spools 10 and 30, which can weigh, for example, several hundred grams, are driven with a movement which is nearly constant as a result of the inertia thereof, and are not exposed or subjected to controls in a sequence as fast as a millisecond. The arms 15 and 35 compensate for the relatively slow or long-term fluctuations which can occur in the unwinding of the band.

During operation, the light-weight units or groups 41–42 and 61–62 are subjected to slight vibrations at a frequency of about 1,000 Hz. The amplitude of these vibrations is in the order of 1 millimeter, for example.

Due to the inertia of the spool 10 at the starting time of tape movement, it is necessary for the pulley and lever arrangement 41–42, which assumes the position 41′–42′ to impart to the band a slackening as soon as the capstan 24 begins driving the band and before the spool 10 having a great inertia has reached its speed. If this were not done, the band would tear due to the traction of the capstan on the band which is held by the difficult to move spool 10. For this purpose, the current pulse which is furnished by the monostable flip-flop causes the arm 42 to deflect toward the right to position 42′ by reason of the action of the electromagnet 44, thereby automatically introducing a slack in the band permitting proper driving of the band by the capstan.

On the other hand, it may happen that during the treatment of data, a longer stopping time is required for one type or character, for example, a period of 10 milliseconds. Since the winding spool is no longer energized but continues to turn due to its inertia, there would result an excessive tension on the band B which could lead to the rupture thereof if a slack is not introduced in the band. The present invention then provides for such slack by causing the pulley and lever arrangement 61–62 to be attracted toward the left by the electro-magnet 64 so as to assume the position 61'–62', thus giving to the band the necessary slack so that the winding spool can continue to turn due to its inertia without producing a dangerous tension in the band.

The springs 43 and 63 are calibrated in a manner such that the force necessary to effect return of the respective light-weight arms 42, 62 is greater than that which the arm 35, which has a great inertia, will provide on the winding side, or the arm 15 will provide on the unwinding side. The arms 42 and 62 are advantageously made in the form of a light-weight hollow tube. With the pulleys 41 and 61 being made from plastic, each unit weighs, for example, 2 to 3 grams.

The delay time of the monostable flip-flop 46 is in the order of several durations of the applied signals, for example 2 to 3 milliseconds for a sequence of 1,000 signals per second. The arm 42 receives a deflection toward the right for the entire duration of the operation which does not, however, impair the latter.

The delay time of the monostable flip-flop 51 is calibrated in a manner such that, during the operation with normal timing and speed, the actuating signal coming from the monostable flip-flop 51 arrives at the gate 52 when the braking control of the signal 70 is already over; therefore, the braking signal is thus without effect to operate the electromagnet 64. If the signal 70 produces a more prolonged stopping order, the AND circuit 52 transmits to the amplifier 65 an order for the deflection of the unit 61–62 by the electromagnet 64, since the braking order will then exceed the delay time of flip-flop 51.

It is possible to simplify the logic by deleting the members 50, 51 and 52. The rise time of the current in the electromagnet 64 is not immediate; in the presence of a brief signal, the electromagnet 64 is de-energized before having been completely actuated. If the braking signal is longer, the electromagnet 64 will effectively enter into operation. By means of an appropriate calibration of the parameters of the electromagnet 64, it will be possible to thus obtain by proper selection the desired operation without exterior logical members.

The installation may comprise a second drive capstan which is placed in a symmetrical position with respect to the reading member 22 if it is desired that the installation operate in both winding directions. In that case, an inverter for the control of the light-weight units will have to be added.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. In a high-speed band reader, for example for a perforated paper band, performing an immoble reading process at speeds up to one thousand characters per second, including an unwinding spool carrying said band and a winding spool for receiving said band from said unwinding spool, driving means for driving said band between said spools, reading means for reading data on said band and braking means for stopping said band periodically in response to an applied braking signal to enable reading of said data by said reading means, the improvement comprising compensating means responsive to said braking means for introducing slack in said band to overcome the inertia effects of said speed during times of an abrupt change of speed of said band, wherein said compensating means includes band adjusting means located between said driving means and said unwinding spool for introducing slack in said band upon release of said braking means, and wherein said band adjusting means includes an ultra-light pulley over which said band passes, an ultra-light pivot arm having said pulley mounted thereon, an elastic element for biasing said pulley against said band to tension said band, and means for deflecting said pulley away from said band during intervals between operation of said braking means.

2. A high-speed band reader as defined in claim 1, wherein said deflecting means includes an electromagnet having a movable armature connected to said pivot arm and a monostable multivibrator connected to said electromagnet for selective operation thereof, and wherein said driving means includes an inverter receiving said braking signal at the input thereof and having its output connected to a driving member for driving said band, the output of said inverter also being connected in control of said multivibrator.

3. In a high-speed band reader, for example for a perforated paper band, performing an immoble reading process at speeds up to one thousand characters per second, including an unwinding spool carrying said band and a winding spool for receiving said band from said unwinding spool, driving means for driving said band between said spools, reading means for reading data on said band and braking means for stopping said band periodically in response to an applied braking signal to enable reading of said data by said reading means, the improvement comprising compensating means responsive to said braking means for introducing slack in said band to overcome the inertia effects of said speed during times of an abrupt change of speed of said band, wherein said compensating means includes band adjusting means located between said driving means and said winding spool for introducing slack in said band upon actuation of said braking means, and wherein said band adjusting means includes an ultra-light pulley over which said band passes, an ultra-light pivot arm having said pulley mounted thereon, an elastic element for biasing said pulley against said band to tension said band, and means for deflecting said pulley away from said band during intervals between operation of said braking means.

4. A high-speed band reader as defined in claim 3, wherein said deflecting means includes an electromagnet having a movable armature connected to said pivot arm and a monostable multivibrator responsive to said braking signal connected to said electromagnet.

5. A high-speed band reader as defined in claim 4, wherein said deflecting means further includes an AND gate having one input receiving said braking signal directly and a second input connected to the output of said multivibrator, the output of said AND gate being connected to said electromagnet.

6. A high-speed band reader as defined in claim 5, wherein said compensating means includes additional band adjusting means located between said driving means and said unwinding spool for introducing slack in said band upon release of said braking means.

7. A high-speed band reader as defined in claim 6, wherein said additional band adjusting means includes an ultra-light pulley over which said band passes, an ultra-light pivot arm having said pulley mounted thereon, an elastic element for biasing said pulley against said band to tension said band, and means for deflecting said pulley away from said band during intervals between operation of said braking means.

8. A high-speed band reader as defined in claim 7, wherein said deflecting means of said additional band adjusting means includes an electromagnet having a movable armature connected to said pivot arm and a monostable multi-vibrator connected to said electromagnet for selective operation thereof, and wherein said driving means includes an inverter receiving said braking signal at the input thereof and having its output connected to a driving member for driving said band, the output of said inverter also being connected in control of said multivibrator.

* * * * *